(12) United States Patent
Higashiyama

(10) Patent No.: US 7,855,734 B2
(45) Date of Patent: Dec. 21, 2010

(54) IMAGE PROCESSING APPARATUS, CONTROL METHOD THEREOF, PROGRAM, AND STORAGE MEDIUM

(75) Inventor: Teruyuki Higashiyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/564,891

(22) Filed: Sep. 22, 2009

(65) Prior Publication Data

US 2010/0010972 A1    Jan. 14, 2010

Related U.S. Application Data

(63) Continuation of application No. 11/335,649, filed on Jan. 20, 2006, now Pat. No. 7,612,808.

(30) Foreign Application Priority Data

Feb. 17, 2005    (JP) .............................. 2005-040895

(51) Int. Cl.
H04N 5/76    (2006.01)
(52) U.S. Cl. ............... 348/231.2; 348/231.6; 348/231.9
(58) Field of Classification Search .............. 348/231.2, 348/231.6, 231.9
See application file for complete search history.

(56) References Cited

U.S. PATENT DOCUMENTS

| | | | |
|---|---|---|---|
| 4,999,790 | A | 3/1991 | Murayama et al. |
| 5,477,510 | A | 12/1995 | Ukita |
| 5,949,953 | A | 9/1999 | Shirakawa et al. |
| 6,480,864 | B1 | 11/2002 | Fong et al. |
| 6,539,164 | B2 | 3/2003 | Shirakawa et al. |
| 6,577,805 | B1 | 6/2003 | Hirai |
| 7,098,947 | B2 | 8/2006 | Iwauchi |
| 7,212,728 | B2 | 5/2007 | Shirakawa et al. |
| 7,227,576 | B2 | 6/2007 | Umeyama |
| 7,382,405 | B2 | 6/2008 | Kusaka et al. |
| 7,391,438 | B2 | 6/2008 | Yoshizawa et al. |
| 2002/0044760 | A1 | 4/2002 | Shirakawa et al. |
| 2002/0057473 | A1 | 5/2002 | Umeyama |
| 2002/0186303 | A1 | 12/2002 | Aizawa et al. |
| 2003/0095195 | A1 | 5/2003 | Iwauchi |

(Continued)

FOREIGN PATENT DOCUMENTS

EP    1460550 A1    9/2004

(Continued)

OTHER PUBLICATIONS

Japanese Office Action in corresponding Japanese Application No. 2005-040895, dated Jun. 23, 2008.

(Continued)

Primary Examiner—James M Hannett
(74) Attorney, Agent, or Firm—Fitzpatrick, Cella, Harper & Scinto

(57) ABSTRACT

An image processing apparatus for recording and reproducing an image, comprises: a recording unit that records the image; a search unit that searches file data recorded in the recording unit when the apparatus is started; an operation unit that designates a predetermined operation to the apparatus; and a control unit that enables acceptance of an operation upon designation of the operation by said operation unit during a search of said search unit, even before the search is completed.

12 Claims, 16 Drawing Sheets

U.S. PATENT DOCUMENTS

| | | |
|---|---|---|
| 2003/0107660 A1 | 6/2003 | Watanabe |
| 2003/0210898 A1 | 11/2003 | Juen et al. |
| 2005/0174448 A1 | 8/2005 | Kuboi |
| 2005/0190415 A1 | 9/2005 | Ueda |
| 2008/0068486 A1 | 3/2008 | Kusaka |

FOREIGN PATENT DOCUMENTS

| | | |
|---|---|---|
| JP | 2516387 | 2/1989 |
| JP | 6089310 A | 3/1994 |
| JP | 8111843 A | 4/1996 |
| JP | 8130700 A | 5/1996 |
| JP | 8140043 A | 5/1996 |
| JP | 8163497 A | 6/1996 |
| JP | 11327855 A | 11/1999 |
| JP | 2001209545 A | 8/2001 |
| JP | 2002077673 A | 3/2002 |
| JP | 2003158645 A | 5/2003 |
| JP | 2003244509 A | 8/2003 |
| JP | 2003317447 A | 11/2003 |
| JP | 2004088549 A | 3/2004 |
| JP | 2004112708 A | 4/2004 |
| JP | 2004258546 A | 9/2004 |
| KR | 100050084 B1 | 11/1991 |
| KR | 1019990002748 A | 1/1999 |
| KR | 100219748 B1 | 6/1999 |
| KR | 1020030026403 A | 4/2003 |
| KR | 100444557 B1 | 8/2004 |
| KR | 1020040104574 A | 12/2004 |
| WO | 03049424 A1 | 6/2003 |

OTHER PUBLICATIONS

Anonymous: User Manual for Canon 300D "Digital Rebel" Canon Instruction Manual, [Online] Aug. 2003, pp. 1-140, XP002473726.

Braban B et al: "A Well Structured Parallel File System for PM" Operating Systems Review, ACM, New York, NY, US, vol. 23, No. 2, Apr. 1, 1989, pp. 25-38, XP00140479.

European Search Report in corresponding European Application No. 06250584.7 dated Apr. 14, 2008.

WITH NO DATA INDICATION

WITH DATA INDICATION

10-IMAGE JUMP SEARCH

MOVING-IMAGE JUMP SEARCH

DATE JUMP SEARCH

NORMAL DISPLAY

ENLARGED DISPLAY 1

ENLARGED DISPLAY 2

F I G. 14A

MEMORY STATE UPON ACQUISITION OF LAST IMAGE

| DIRECTORY NUMBER | EXISTENCE/ABSENCE OF DIRECTORY | NUMBER OF IMAGES | SEARCH COMPLETED? | FILE NUMBER |
|---|---|---|---|---|
| 100 | 1 | | 0 | |
| 101 | 1 | | 0 | |
| ... | | | | |
| 500 | 0 | | | |
| ... | | | | |
| 998 | 1 | 3 | 1 | 9801<br>9802<br>9803 |
| 999 | 0 | | | |

MEMORY STATE UPON COMPLETION OF ALL IMAGE SEARCH

| DIRECTORY NUMBER | EXISTENCE/ABSENCE OF DIRECTORY | NUMBER OF IMAGES | SEARCH COMPLETED? | FILE NUMBER |
|---|---|---|---|---|
| 100 | 1 | 5 | 1 | 0001<br>0002<br>0003<br>0004<br>0005 |
| 101 | 1 | 4 | 1 | 0101<br>0102<br>0103<br>0104 |
| ... | | | | |
| 500 | 0 | | | |
| ... | | | | |
| 998 | 1 | 3 | 1 | 9801<br>9802<br>9803 |
| 999 | 0 | | | |

← SEARCH ORDER

FIG. 15

| DIRECTORY NUMBER | EXISTENCE/ABSENCE OF DIRECTORY | NUMBER OF IMAGES | SEARCH COMPLETED? | FILE NUMBER |
|---|---|---|---|---|
| 100 | 1 | | 0 | |
| 101 | 1 | 4 | 1 | 0101<br>0102<br>0103<br>0104 |
| ... | | | | |
| 500 | 0 | | | |
| ... | | | | |
| 998 | 1 | 3 | 1 | 9801<br>9802<br>9803 |
| 999 | 0 | | | |

# IMAGE PROCESSING APPARATUS, CONTROL METHOD THEREOF, PROGRAM, AND STORAGE MEDIUM

This application is a continuation of U.S. patent application Ser. No. 11/335,649, filed Jan. 20, 2006 (allowed), the contents of which are incorporated by reference herein.

FIELD OF THE INVENTION

The present invention relates to an image processing apparatus that records and reproduces still images, moving images, sound and the like, a control method of said apparatus, a computer program, and a computer-readable storage medium.

BACKGROUND OF THE INVENTION

Image processing apparatuses such as electronic cameras which photograph, record, and reproduce still images and moving images using a memory card having a solid-state memory as a recording medium have already been available in the market. There are also apparatuses which reproduce and display still images and moving images recorded in a recording medium on an electronic viewfinder such as a color liquid crystal panel.

Recently, as recording media such as memory cards have increased the storage capacity, a memory card can store a large amount of images. At the same time, many directories can be generated in the memory card (e.g., Japanese Patent Application Laid-Open No. 2004-112708).

In a case where such conventional image processing apparatus is started to reproduce and display an image stored in a memory card storing a large amount of images and directories, searching an image in the memory card takes time. As a result, the apparatus requires a long time before it can accept a next operation such as button depression, thus causing inconvenience.

SUMMARY OF THE INVENTION

The present invention has been proposed in view of the above-described problem, and has as its object to reduce the time necessary before the apparatus can display image data during a file search.

In order to solve the above-described problem and achieve the object, the present invention provides an image processing apparatus for recording and reproducing an image, comprising: a recording unit adapted to record the image; a search unit adapted to search file data recorded in the recording unit when the apparatus is started; an operation unit adapted to instruct a predetermined operation to the apparatus; and a control unit adapted to, in a case where the operation unit performs an operation during a search of the search unit, enable acceptance of the operation even before the search is completed.

Furthermore, the present invention provides A control method of an image processing apparatus having a recording unit for recording an image and an operation unit for instructing a predetermined operation, comprising the steps of:

searching file data recorded in the recording unit when the apparatus is started; and in a case where the operation unit performs an operation during a search in the searching step, controlling to enable acceptance of the operation even before the search is completed.

By virtue of the present invention, even if a file search or a directory search is in progress upon startup of the apparatus, it is possible to reduce the time necessary before the apparatus can accept a predetermined operation.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 14A is a view showing a memory state upon acquisition of last image.

FIG. 15 is a view showing data recorded in a memory when a directory search is temporarily halted and resumed.

DETAILED DESCRIPTION OF THE PREFERRED EMBODIMENTS

A preferred embodiment of the present invention will now be described in detail with reference to the accompanying drawings.

Note that the embodiment which will be described below is provided as an example realizing the present invention, and should appropriately be corrected or modified in accordance with various conditions and configurations of the apparatus to which the present invention is applied. Therefore, the present invention is not limited to the following embodiment.

Figure 1:
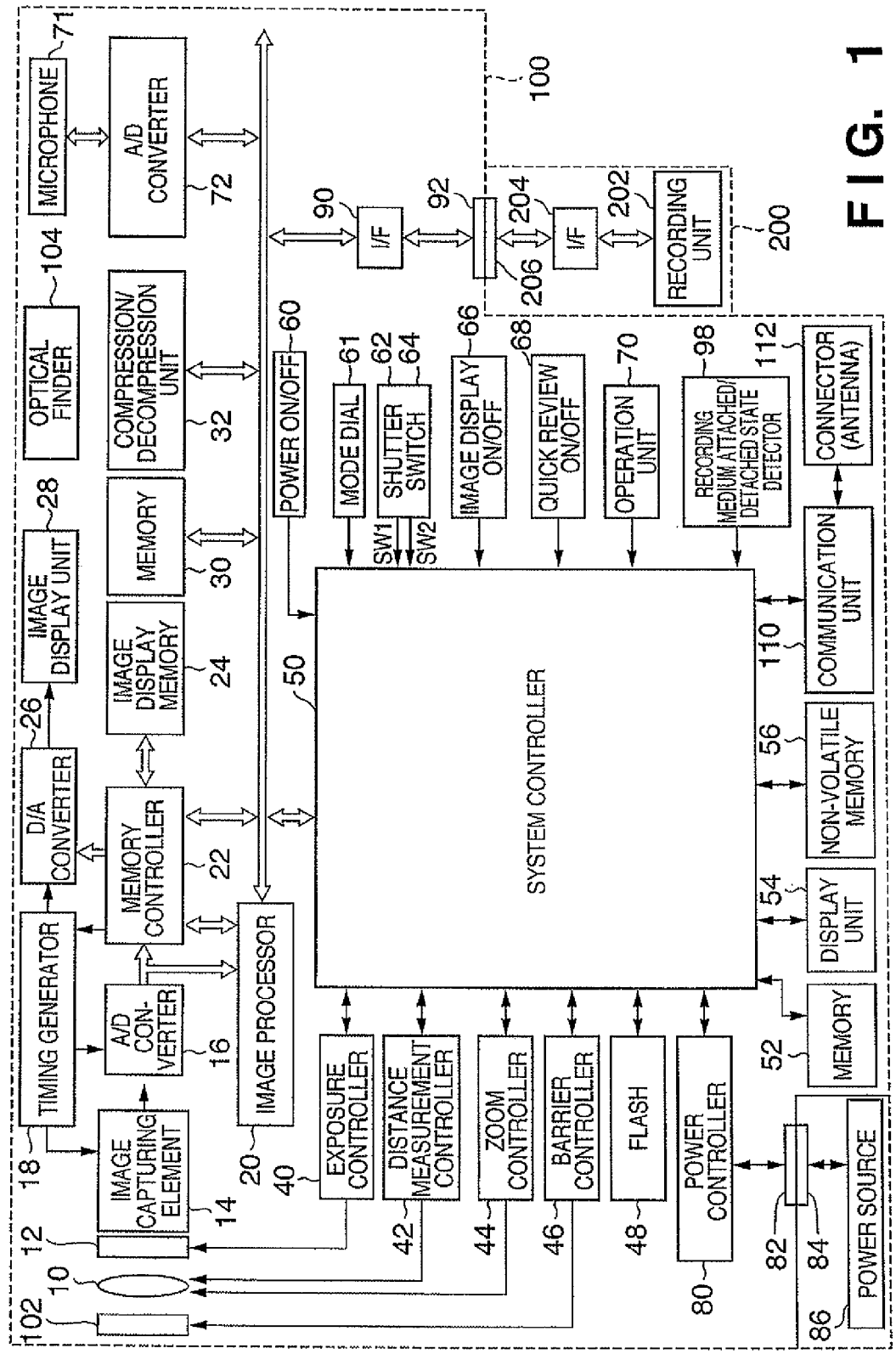
FIG. 1 is a block diagram showing a construction of an image processing apparatus according to an embodiment of the present invention.

FIG. 1 is a block diagram showing a construction of an electronic camera according to an embodiment of the present invention.

In FIG. 1, numeral 100 denotes an image processing apparatus typified by an electronic camera.

Numeral 10 denotes a photographing lens; 12, a shutter having a diaphragm function; 14, an image capturing element which converts an optical image to electric signals; and 16, an A/D converter which converts analog signals outputted by the image capturing element 14 to digital signals.

Numeral 18 denotes a timing generator which supplies clock signals and control signals respectively to the A/D converter 16 and a D/A converter 26, under the control of a memory controller 22 and a system controller 50.

Numeral 20 denotes an image processor which performs predetermined pixel interpolation and color conversion processing on image data from the A/D converter 16 or image data from the memory controller 22.

The image processor 20 performs predetermined calculations using the sensed image data. Also, the image processor 20 performs through-the-lens (TTL) auto focus (AF) processing, auto exposure (AE) processing, pre-flash (EF) processing as the control performed by the system controller 50 on an exposure controller 40 and a distance measurement controller 42 based on the calculation results.

Further, the image processor 20 performs predetermined calculations using the sensed image data, and performs TTL auto white balance (AWB) processing based on the calculation results.

Numeral 22 denotes a memory controller which controls the A/D converter 16, the timing generator 18, the image processor 20, an image display memory 24, the D/A converter 26, a memory 30, a compression/decompression unit 32, and an A/D converter 72.

The image data outputted from the A/D converter 16 is written into the image display memory 24 or the memory 30 via the image processor 20 and the memory controller 22, or only via the memory controller 22.

Numeral 24 denotes an image display memory; 26, a D/A converter; 28, an image display unit configured by a TFT, LCD or the like. Image data written in the image display memory 24 is displayed on the image display unit 28 via the D/A converter 26.

An electronic viewfinder function can be realized by sequentially displaying sensed image data on the image display unit 28.

Further, the image display unit 28 can arbitrarily be turned ON or OFF in accordance with an instruction from the system controller 50. If the display is turned OFF, the electric consumption of the image processing apparatus 100 can be greatly reduced.

Numeral 30 denotes a memory for storing sensed still images and moving images, and has a sufficient storage capacity for storing a predetermined number of still images and a predetermined period of moving images.

By virtue of this, in serial photographing where plural numbers of still images are serially photographed or in panoramic photographing, a large amount of image data can be written into the memory 30 at high speed.

Further, the memory 30 can be used as a work area of the system controller 50.

Numeral 32 denotes a compression/decompression unit which compresses or decompresses image data by adaptive discrete cosine transformation (ADCT) or the like. The compression/decompression unit 32 reads image data stored in the memory 30 and performs compression or decompression processing on the read image data, and writes the processed data into the memory 30.

Numeral 40 denotes an exposure controller which controls the shutter 12 having a diaphragm function. The exposure controller 40 interlocked with a flash 48 also has a flash controlling function.

Numeral 42 denotes a distance measurement controller which controls focusing of the photographing lens 10. Numeral 44 denotes a zoom controller which controls zooming of the photographing lens 10. Numeral 46 denote a barrier controller which controls the operation of a protector 102 serving as a barrier.

Numeral 48 denotes a flash having an AF auxiliary light projection function and a flash controlling function.

The system controller 50 controls the exposure controller 40 and the distance measurement controller 42 by the TTL method, in accordance with the results of calculation performed by the image processor 20 based on the sensed image data.

Numeral 50 denotes a system controller which controls the overall image processing apparatus 100. Numeral 52 denotes a memory which stores constants, variables, and programs for operation of the system controller 50.

Numeral 54 denotes a display unit such as a liquid crystal display device, a speaker and the like, which displays operating statuses, messages and the like by using texts, images, sound and so on, in correspondence with execution of a program by the system controller 50. One or plural display units 54 are provided at an easily recognizable positions near the operation unit of the image processing apparatus 100. The display unit 54 is constructed with combinations of, e.g., an LCD, an LED, a sound generating device and so forth.

Part of the functions of the display unit 54 is provided within the optical finder 104.

The display contents of the display unit 54 displayed on the LCD or the like include: indication of single-shot/serial-shot mode, a self timer, a compression rate, the number of recording pixels, the number of recorded images, the number of recordable images, a shutter speed, an f-stop value, exposure compensation, flash illumination, pink-eye effect mitigation, macro photographing, a buzzer-set state, a timer battery level, a battery level, an error state, information using plural digit numbers, an attached/detached status of recording medium 200, operation of communication I/F, and date and time.

Further, the display contents of the display unit 54 displayed within the optical finder 104 include: a focus state, a camera shake warning, a flash charge state, a shutter speed, an f-stop value, and exposure compensation.

Numeral 56 denotes an electrically erasable and recordable nonvolatile memory such as an EEPROM.

Numerals 60, 61, 62, 64, 66, 68, and 70 denote operation units for inputting various operation instructions to the system controller 50, comprising a single or plurality of combinations of switches, dials, touch panels, a pointing device employing line-of-sight detection, a voice recognition device, and the like.

Next, the operation units will be described in detail.

Numeral 60 denotes a power ON/OFF switch which starts and terminates the image processing apparatus 100.

Numeral 61 denotes a mode dial switch which enables selection of various function modes such as a photographing mode and a reproduction mode.

Numeral 62 denotes a shutter switch SW1 which is turned ON by half stroke of a shutter button (not shown), and instructs start of the operations of the AF processing, the AE processing, the AWB processing, the EF processing and the like.

Numeral 64 denotes a shutter switch SW2 which is turned ON by full stroke of the shutter button (not shown). The shutter switch SW2 instructs start of a series of operations including: exposure processing to write signals read from the image capturing element 14 into the memory 30 via the A/D converter 16 and the memory controller 22, development processing utilizing calculations performed by the image processor 20 and the memory controller 22, and recording processing to read the image data from the memory 30, compress the image data by the compression/decompression unit 32, and write the compressed image data into the recording medium 200.

Numeral 66 denotes an image display ON/OFF switch which can set ON/OFF of the image display unit 28.

With this function, in photographing an image using the optical finder 104, power supply to the image display unit configured with a TFT, an LCD or the like can be cut off to save power.

Numeral 68 denotes a quick review ON/OFF switch which sets a quick review function for automatically reproducing sensed image data immediately after a photographing operation. Assume that the present embodiment in particular has a function that the quick review function is set when the image display unit 28 is turned OFF.

Numeral 70 denotes an operation unit comprising various buttons and touch panels including: a menu button, a set button, a macro selection button, a multi-screen reproduction/repaging button, a flash setting button, a single-shot/serial-shot/self-timer selection button, a forward (+) menu item selection button, a backward (−) menu item selection button, a forward (+) reproduction image search button, a backward (−) reproduction image search button, a photographing quality selection button, an exposure compensation button, and a date/time set button.

Numeral 71 denotes a microphone which converts sound to electric data. Numeral 72 denotes an A/D converter which converts analog signals from the microphone 71 to digital signals.

Numeral 80 denotes a power controller comprising a battery detection circuit, a DC-DC converter, a switch circuit for selecting the block to be energized, and the like. The power controller 80 detects the attached/detached state of the battery, the battery type and the remaining battery power level, controls the DC-DC converter based on the detection result and an instruction from the system controller 50, and supplies a necessary voltage for a necessary period to the respective parts including the recording medium.

Numerals 82 and 84 denote connectors; and 86, a power source comprising a primary battery such as an alkaline battery or a lithium battery, a secondary battery such as an NiCd battery, an NiMH battery or an Li battery, an AC adapter, and the like.

Numerals 90 and 94 denote interfaces for a recording medium such as a memory card or a hard disk. Numerals 92 and 96 denote connectors for connection with the recording medium such as a memory card or a hard disk. A recording medium attached/detached state detector 98 detects whether or not the recording medium 200 is attached to the connector 92 and/or 96.

The present embodiment assumes that two systems of interfaces and connectors are provided for connection with the recording medium. However, a single or plurality of systems including interfaces and connectors may be provided. Further, interfaces and connectors pursuant to different standards may be combined. For the interfaces and connectors, cards in conformity with Personal Computer Memory Card International Association standards (PCMCIA cards) or cards in conformity with compact flash (CF) card standards may be used.

In a case where cards and connectors in conformity with the PCMCIA standards, CF card standards and the like are used as the interfaces 90 and 94 and the connectors 92 and 96, image data and management information attached to the image data can be transmitted/received between the image processing apparatus and other peripheral devices such as a computer and a printer by connection utilizing various communication cards such as a LAN card, a modem card, a USB card, an IEEE 1394 card, a P1284 card, an SCSI card and a PHS card.

Numeral 102 denotes a protection unit which serves as a barrier to prevent dirt and breakage of the image sensing portion by covering the image sensing portion of the image processing apparatus 100.

Numeral 104 denotes an optical finder which enables photographing without the electronic viewfinder function of the image display unit 28. In the optical finder 104, realized are some of the functions of the display unit 54 including: an indication of focus state, a camera shake warning, a flash charge state, a shutter speed, an f-stop value, exposure compensation and the like.

Numeral 110 denotes a communication unit having various communication functions such as RS232C, USB, IEEE 1394, P1284, SCSI, MODEM, LAN, and wireless communication.

Numeral 112 denotes a connector, or in case of wireless communication, an antenna, for connecting the image processing apparatus 100 with other devices via the communication unit 110.

Numeral 200 denotes a recording medium such as a memory card or a hard disk.

The recording medium 200 has a recording unit 202 configured with a semiconductor memory, a magnetic disk or the like, the interface 204 for communication with the image processing apparatus 100, and the connector 206 for connection with the image processing apparatus 100.

Figure 2:
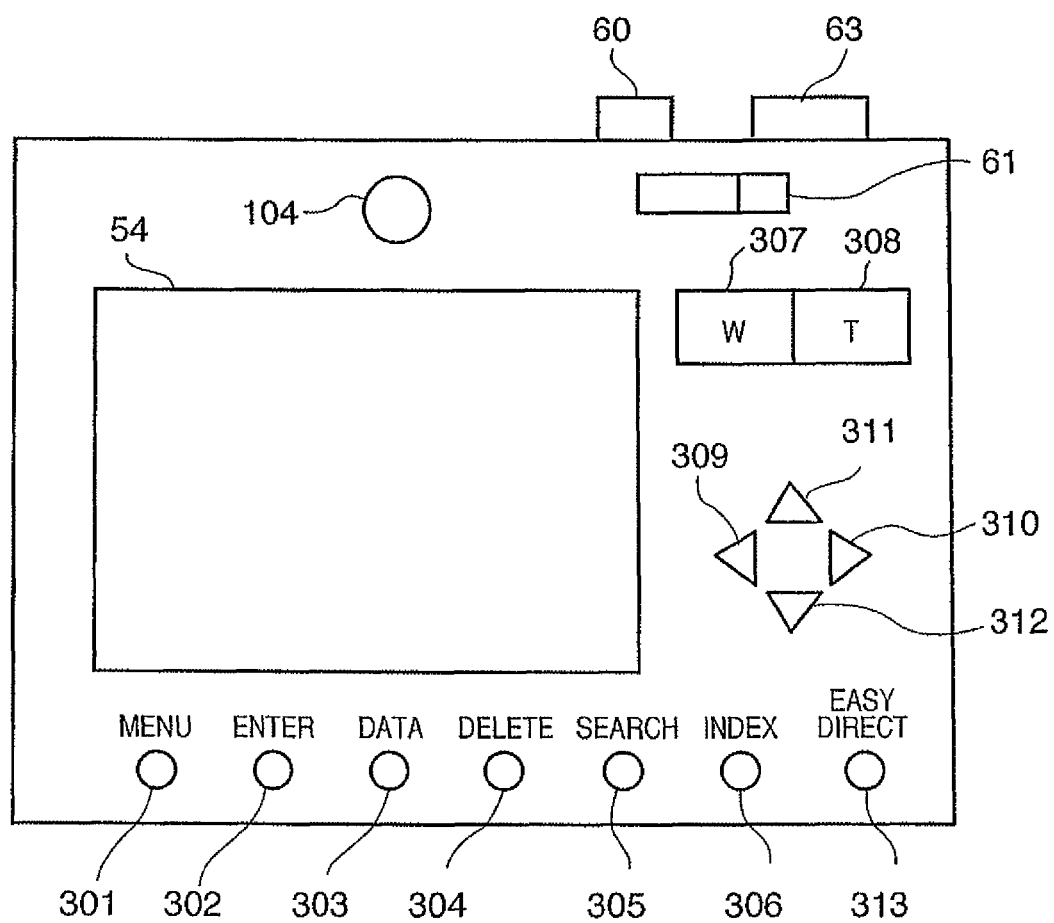
FIG. 2 is a view showing as an example a back surface of the image processing apparatus according to the present invention.

FIG. 2 shows an example of a back surface of the image processing apparatus 100 according to the present embodiment. A menu button 301 can set to display or not display the menu. The menu allows deletion of all images recorded in the recording medium 200, or addition of sound data to a currently displayed image. The added sound data is recorded as a file in the recording medium 200.

An enter button 302 can decide an item selected on the menu.

A data indication ON/OFF button 303 can select switching ON or OFF the data indication of a reproducing image. Data indicated includes a file number, an image number, and photographed date and time.

A delete button 304 can delete a reproducing image.

A search button 305 can search an image recorded in the recording medium 200. Search methods include 10-image jump search, moving-image jump search, date jump search and the like. In the 10-image jump search, images are reproduced for every 10 images. In the moving-image jump search, only the moving images are searched. In the date jump search, images are searched by date.

An index playback button 306 can select switching ON or OFF the index playback display. In index display, plural images are reproduced and displayed simultaneously on the display unit 54.

A reduce button 307 can reduce the size of a displayed image when it is enlarged. When photographing is performed, the button 307 also serves as an operation member to move the zoom lens to a wide angle.

An enlarge button 308 can enlarge the size of a displayed image. When photographing is performed, the button 308 also serves as an operation member to move the zoom lens to a telephoto angle.

A left button 309, a right button 310, an up button 311, and a down button 312 can change a selected item on the menu. The left and right buttons 309 and 310 can also be used for a frame-by-frame advancing operation of reproduction images.

An easy direct button 313 can transfer an image displayed on the display unit 54 to a PC connected to the camera through the communication unit 110. In a case where the camera is connected to a printer through the communication unit 110, the button 313 can transfer an image displayed on the display unit 54 to the printer for printing the image.

Figure 5:
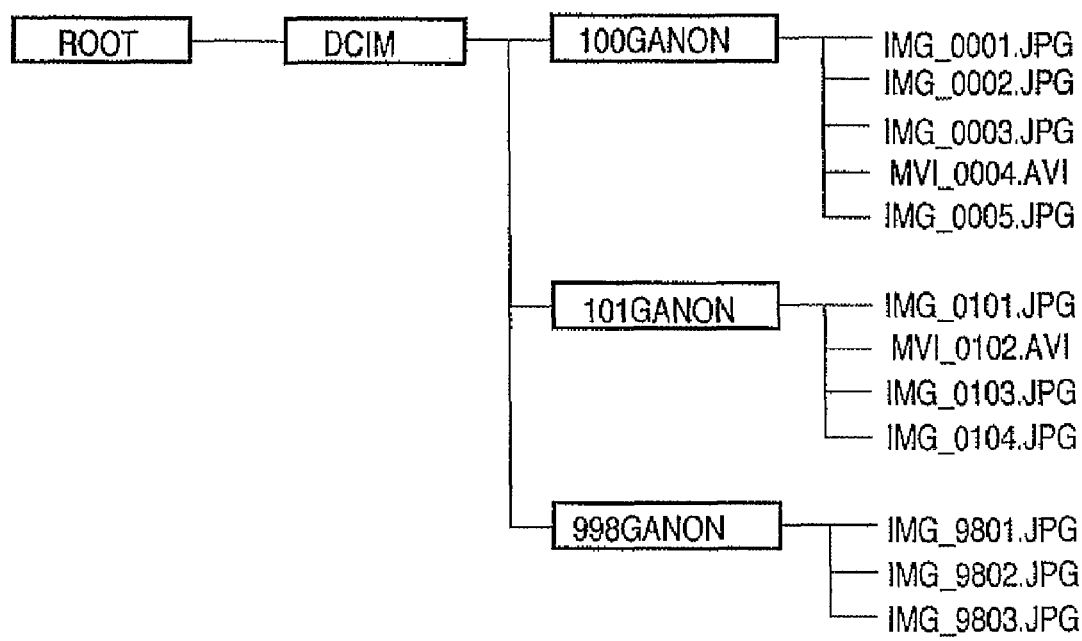
FIG. 5 is a view showing as an example a directory structure according to the embodiment of the present invention.

FIG. 5 shows as an example a directory structure of an image recorded in the recording medium 200. Under the root, there is a DCIM directory which includes xxxGANON directories such as 100GANON. Under the xxxGANON directory, there are image files such as IMG_xxxx.JPG or MVI_xxxx.AVI. The IMG_xxxx.JPG is a still-image file, and the MVI_xxxx.AVT is a moving-image file. In the example shown in FIG. 5, IMG_0001.JPG is image number 1; IMG_0002.JPG is image number 2; IMG_0101.JPG is image number 6; and IMG_9803.JPG is image number 12. The xxx in the xxxGANON directory is called a directory number, which may take 100 to 999. The xxxx in the image file IMG_xxxx.JPG or MVI_xxxx.AVI is called a file number, which may take 0001 to 9999. Among the files in the directory having the smallest directory number, the image file having the smallest file number is image number 1. Among the files in the directory having the largest directory number, the image file having the largest file number has the largest image number (image number=total number of images).

Figure 6:
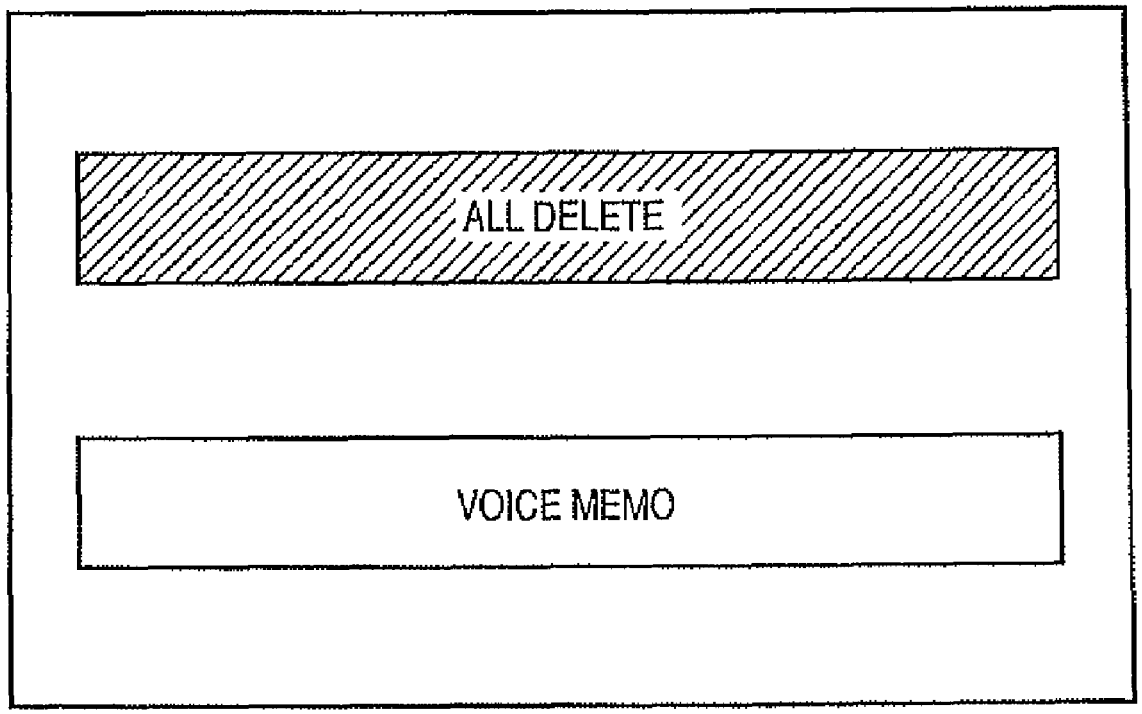
FIG. 6 is a view showing as an example a menu display screen according to the embodiment of the present invention.

FIG. 6 shows as an example a menu displayed by the menu button 301. The menu enables all image deletion or addition of voice memo to a displayed image. In this example, the "all delete" item is selected. If the enter button 302 is depressed in this state, images recorded in the recording medium 200 are all deleted.

Figure 7A:
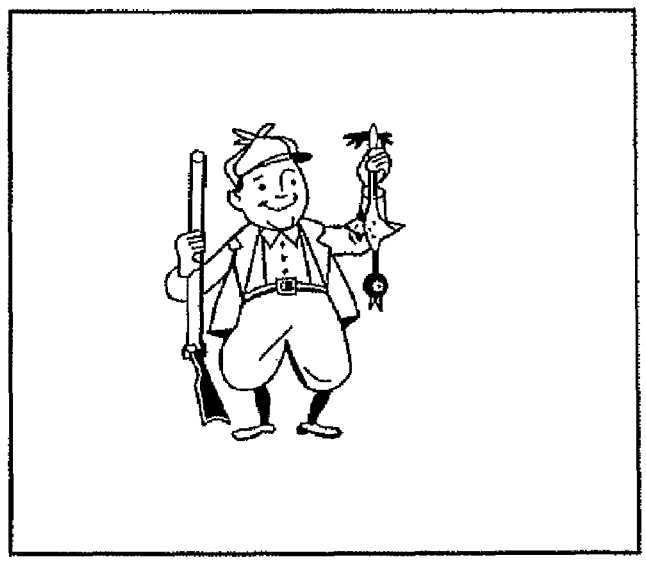
FIGS. 7A and 7B are views showing as an example display screens with data indication and without data indication according to the embodiment of the present invention.
Figure 7B:

FIGS. 7A and 7B show an example of data indication displayed by the data indication ON/OFF button 303. When the data indication is OFF, only the image recorded in the recording medium 200 is displayed as shown in FIG. 7A. When the data indication is ON, the image as well as a file number 701, an image number 702, photographed date and time 703 are displayed as shown in FIG. 7B. The file number 701 indicates that the directory number is 998 and the file number is 9802. The image number 702 indicates the image number being reproduced and the total number of images. In this example, the image number being reproduced is 11, and the total number of images is 12. The photographed date and time 703 indicates that the image is photographed at 12:00 on Dec. 16, 2004. When the data indication ON/OFF button 303 is depressed while the camera is set in the state in FIG. 7A, the image is displayed with data indication as shown in FIG. 7B. When the data indication ON/OFF button 303 is depressed while the camera is set in the state in FIG. 7B, the image is displayed with no data indication as shown in FIG. 7A.

Figure 8:
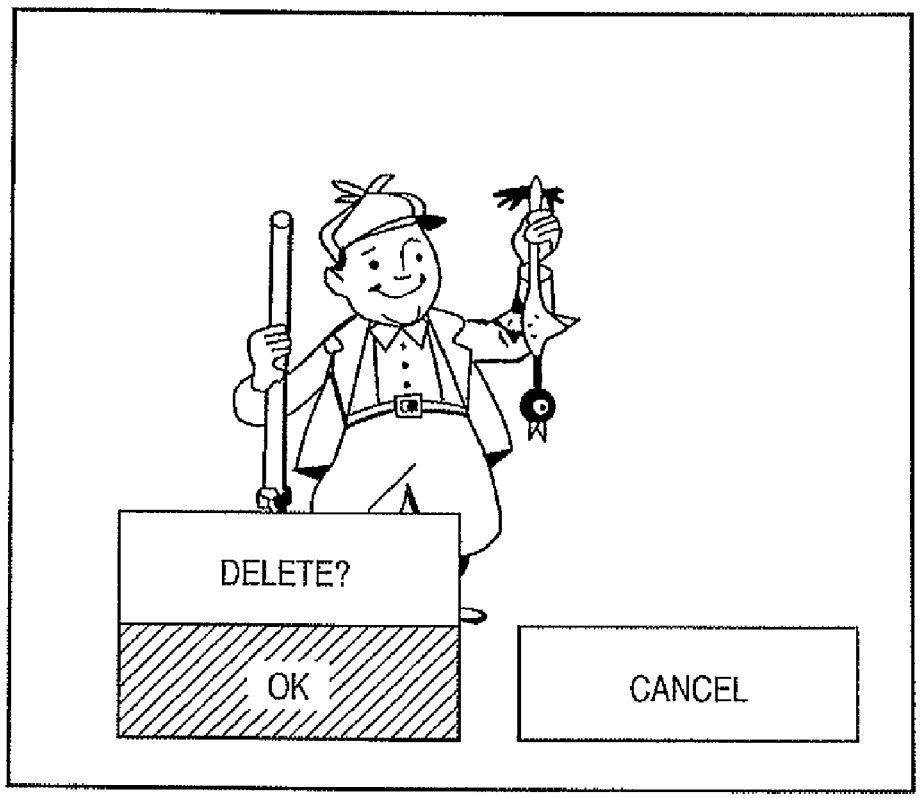
FIG. 8 is a view showing as an example a display screen for delete processing according to the embodiment of the present invention.

FIG. 8 shows as an example a delete screen displayed by the delete button 304. In this example, "OK" is selected. If the enter button 302 is depressed in this state, the image being displayed is deleted from the recording medium 200.

Figure 9A:
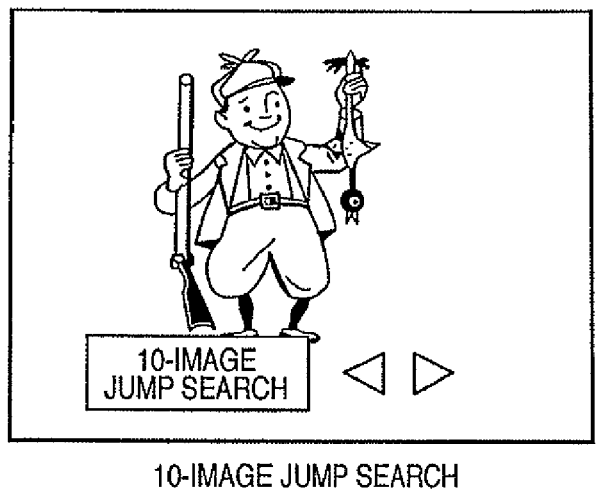
FIGS. 9A to 9C are views showing as an example display screens for search processing according to the embodiment of the present invention.
Figure 9B:
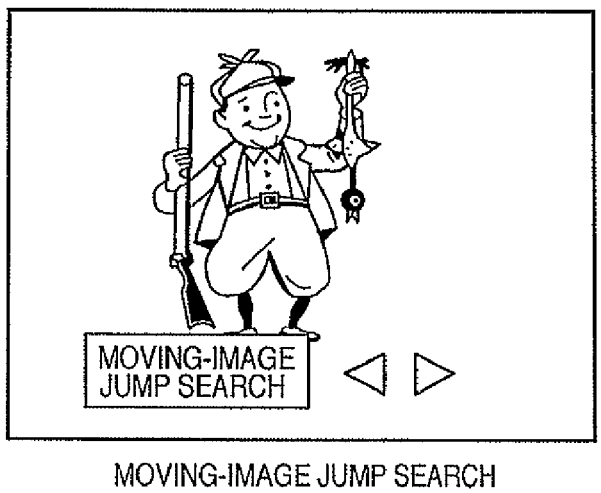
Figure 9C:
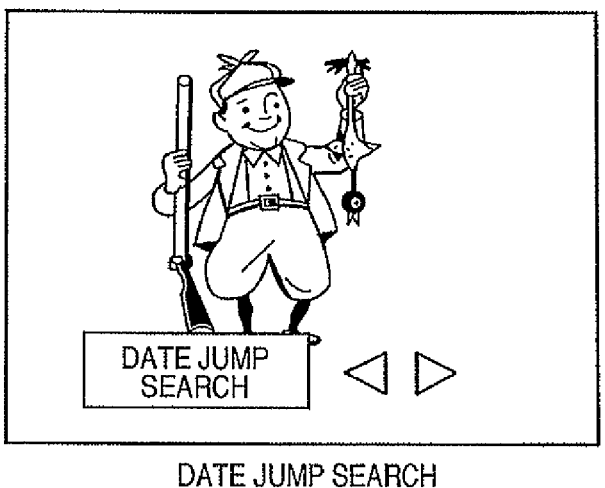

FIGS. 9A to 9C show as an example search screens displayed by the search button 305. When the search screen is not displayed, if the search button 305 is depressed, the 10-image jump screen shown in FIG. 9A is displayed. When the 10-image jump screen is displayed as shown in FIG. 9A, if the left button 309 is depressed, the screen displays an image whose image number is 10 smaller than the image number of the currently displayed image. Meanwhile, if the right button 310 is depressed, the screen displays an image whose image number is 10 larger than the image number of the currently displayed image.

When the 10-image jump screen is displayed as shown in FIG. 9A, if the search button 305 is depressed, the moving-image jump screen shown in FIG. 9B is displayed. When the moving-image jump screen is displayed as shown in FIG. 9B, if the left button 309 is depressed, the screen displays a moving image whose image number is smaller than and is closest to that of the currently displayed image. Meanwhile, if the right button 310 is depressed, the screen displays a moving image whose image number is larger than and is closest to that of the currently displayed image.

When the moving-image jump screen is displayed as shown in FIG. 9B, if the search button 305 is depressed, the date jump screen shown in FIG. 9C is displayed. When the date jump screen is displayed as shown in FIG. 9C, if the left button 309 is depressed, the screen displays a moving image immediately before the currently displayed image. Meanwhile, if the right button 310 is depressed, the screen displays a moving image immediately after the currently displayed image.

In other words, the present embodiment provides a first reproduction mode and a second reproduction mode. In the first reproduction mode, when the left button 309 or the right button 310 is depressed once, the order of file to be reproduced from the recording medium is advanced by one file in accordance with a predetermined reproduction order (ascending or descending order). In the second reproduction mode, when the button is depressed once, the order of file to be reproduced is advanced by n files (n≧1) in accordance with a predetermined reproduction order. The value of n is automatically determined by a predetermined formula in correspondence with the number of photographed files, but can be set arbitrarily by a user.

Figure 10:
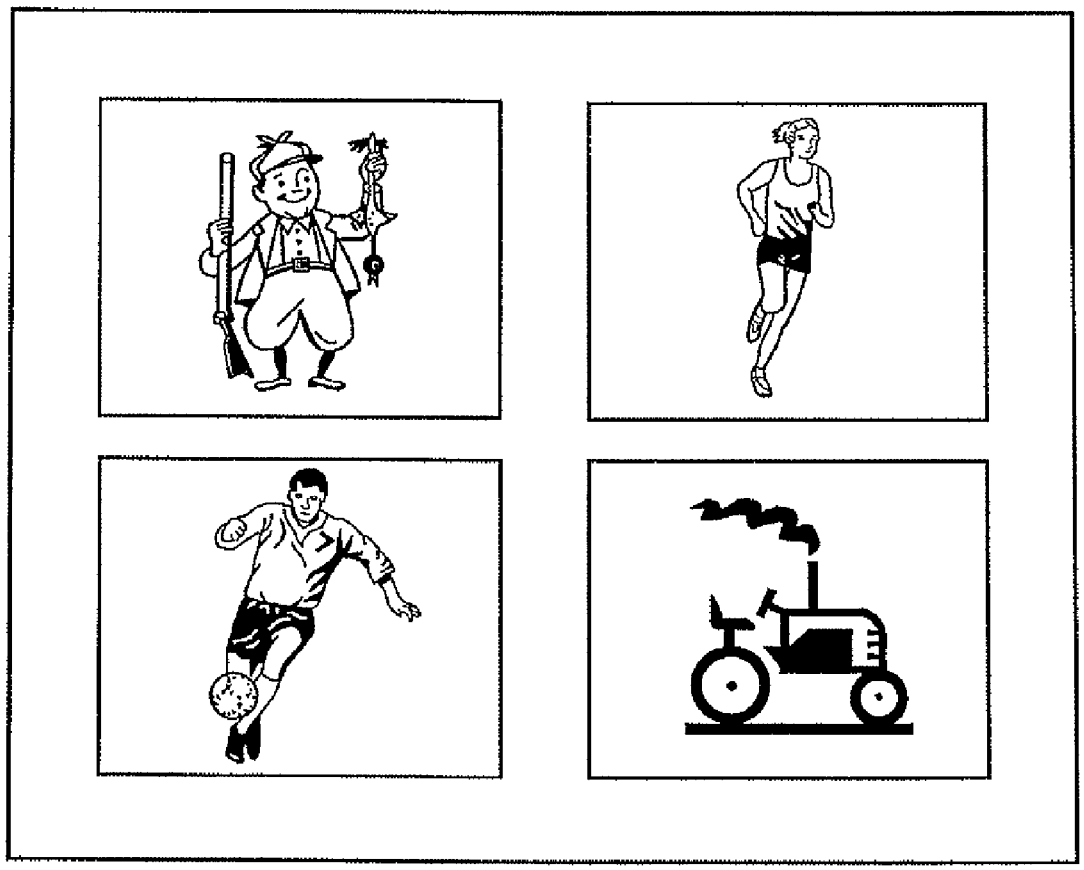
FIG. 10 is a view showing as an example a display screen for index playback according to the embodiment of the present invention.

FIG. 10 shows as an example a screen displayed when the index playback button 306 is depressed. Plural images (herein, four images) are simultaneously displayed on the display unit 54.

Figure 11A:
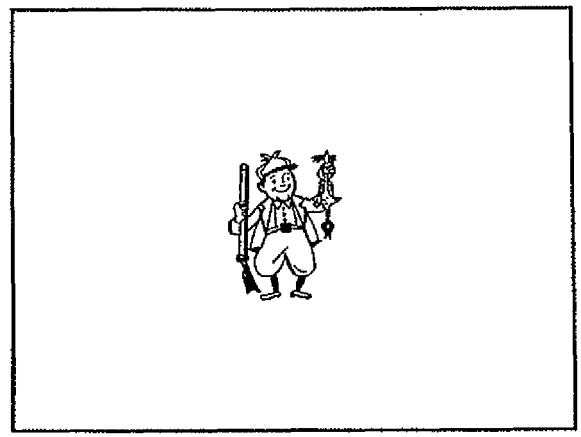
FIGS. 11A to 11C are views showing as an example display screens for enlargement processing according to the embodiment of the present invention.
Figure 11B:
Figure 11C:

FIGS. 11A to 11C show as an example screens of enlarged images when the reduce button 307 or the enlarge button 308 is depressed. When the enlarge button 308 is depressed in the normal display state shown in FIG. 11A, an enlarged image is displayed (enlarged display 1 in FIG. 11B). When the enlarge button 308 is depressed on the enlarged display 1 in FIG. 11B, a further enlarged image is displayed (enlarged display 2 in FIG. 11C). Meanwhile, when the reduce button 307 is depressed on the enlarged display 1 in FIG. 11B, the screen returns to the normal display state in FIG. 11A. When the reduce button 307 is depressed on the enlarged display 2 in FIG. 11C, the enlarged display 1 in FIG. 11B is displayed.

Figure 3:
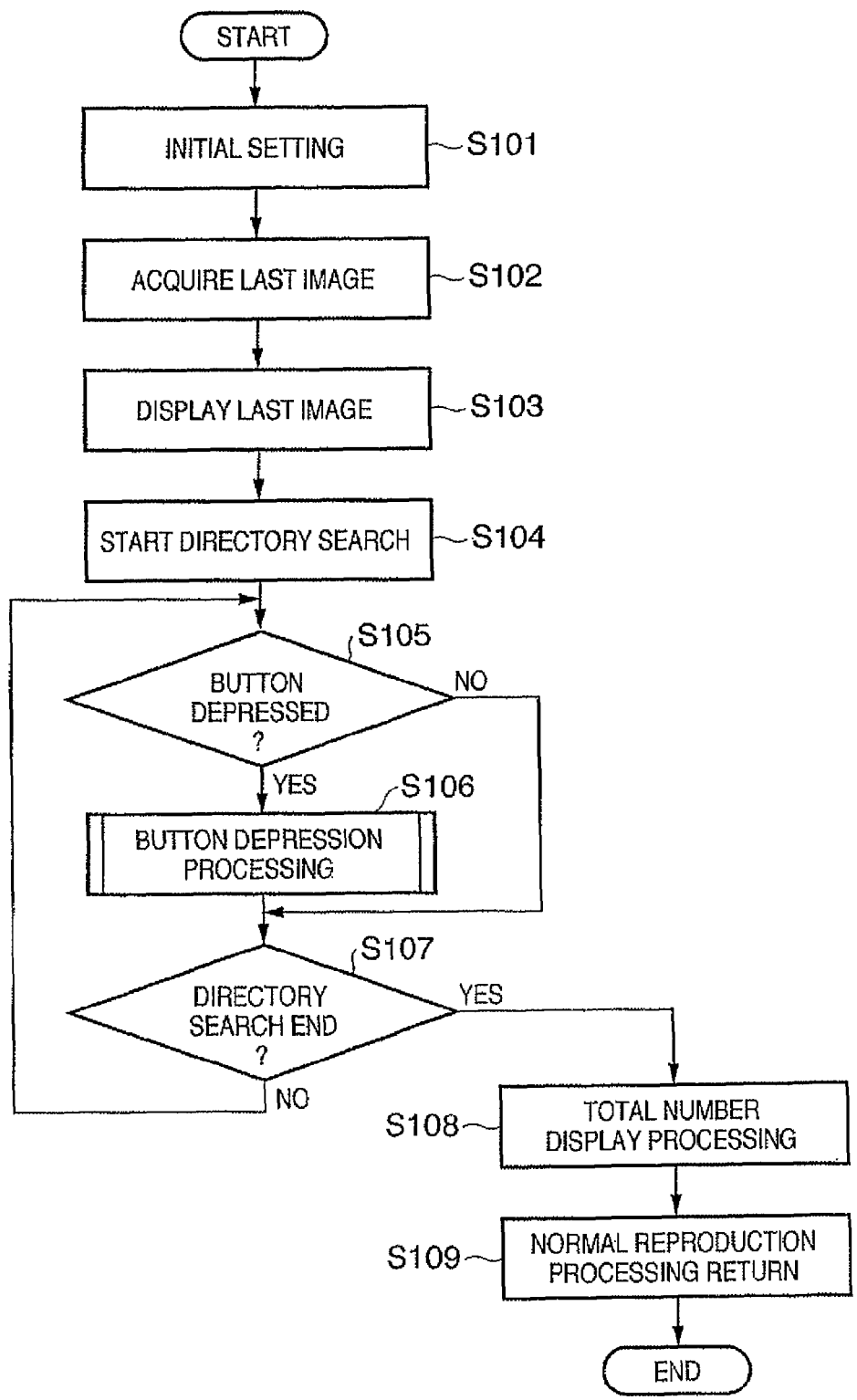
FIG. 3 is a flowchart describing a main routine according to the embodiment of the present invention.
Figure 4:
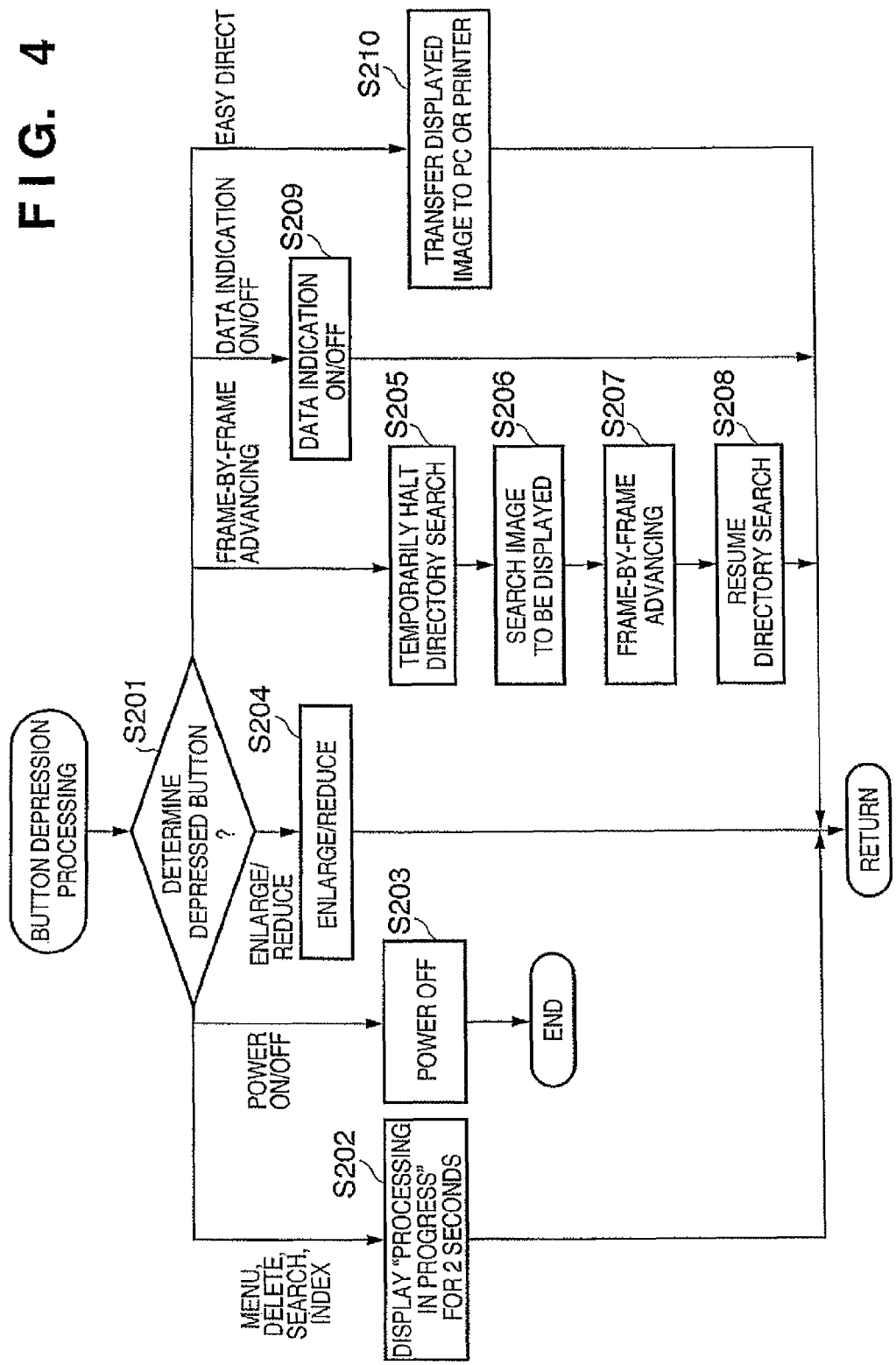
FIG. 4 is a flowchart describing button depression processing according to the embodiment of the present invention.

FIGS. 3 and 4 are flowcharts according to the present embodiment.

When a user of the image processing apparatus 100 turns the mode dial 61 to the reproduction mode and depresses the power ON/OFF button 60, the system controller 50 initializes flags and control variables (S101). Next, the last image of the images recorded in the recording medium 200 and directory data of the recording medium 200 obtained upon acquisition of this image are acquired and stored in the memory 30 (S102). Assume that the images recorded in the recording medium 200 have a directory structure shown in FIG. 5. The image IMG_9803.JPG under the directory 998GANON having the largest image number, and directory data obtained upon acquisition of the last image are acquired and stored in the memory 30.

The directory data is described with reference to FIG. 14A.

The directory data includes directory data of the last image and directory data obtained upon acquisition of the last image.

Recorded as the directory data of the last image is information indicating that the image having the file number 9803 is recorded under the directory 998GANON as shown in FIG. 14A.

Recorded as the directory data obtained upon acquisition of the last image includes: information indicating that there are areas for directory numbers 100 to 999 under the directory DCIM of the recording medium 200 and that directory numbers 100, 101, and 998 exist, information indicating that there are three files numbered 9801, 9802 and 9803 recorded under the directory 998GANON having the largest directory number, and information indicating that the directory search for the 998GANON including the image file 9803 of the largest image number has been completed.

To indicate existence or absence of directories, 1 is recorded in the memory 30 if a directory exists, and 0 is recorded in the memory 30 if a directory does not exist. To indicate whether or not directory search has been completed, 1 is recorded in the memory 30 if the search has been completed, and 0 is recorded in the memory 30 if the search has not been completed.

Next, the system controller displays the last image IMG_9803.JPG on the display unit 54 (S103), and begins the directory search (S104). The directory search includes a file data search, such as what kind of directories exist, how many numbers of image files exist in total, how many numbers of moving-image files exist, which directory stores the moving-image files, in which images the photographed date and time change, and so on.

Figure 14B:
FIG. 14B is a view showing a memory state upon completion of all image search.

The directory search begins in step S104. When the directory search is completed for all directories recorded in the recording medium 200, data shown in FIG. 14B is recorded in the memory 30. As shown in FIG. 14B, search completion is indicated for all numbers where directories exist. Note that the directory search proceeds in order from large-numbered directories to small-numbered directories.

After the system controller 50 begins the directory search (S104), it periodically checks for button depression (S105). The period of checking may be of any period, for instance, 150 msec intervals. When a button depression is detected in step S105, the control proceeds to button depression processing in step S106 where processing according to the depressed button is performed. The button depression processing will be described later with reference to FIG. 4.

Figure 12:
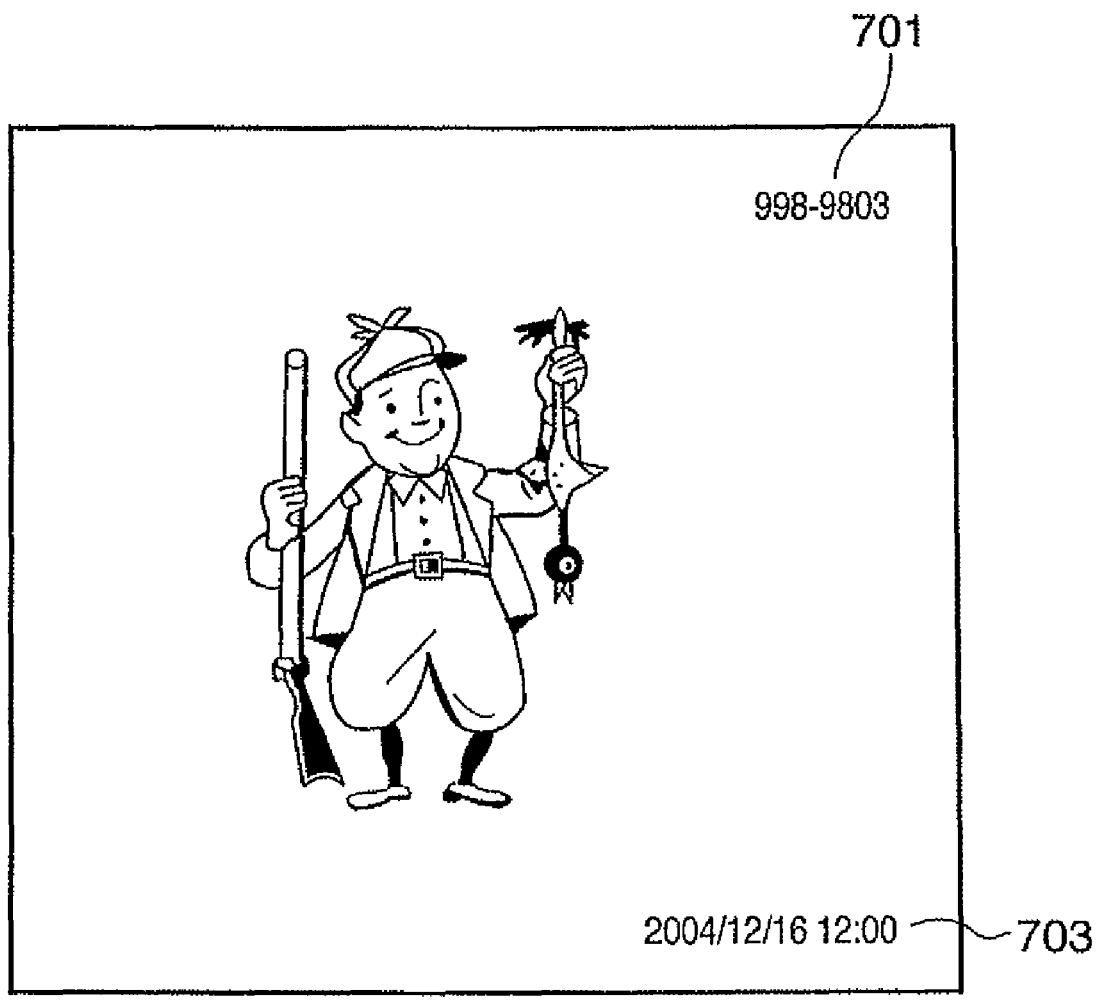
FIG. 12 is a view showing a data indication screen displayed during a directory search according to the embodiment of the present invention.

Next, the system controller 50 proceeds to step S107. In step S107, it is determined whether or not the directory search has ended. If it has not ended, the control returns to step S105. If the directory search has ended in step S107, the total image number display processing is performed in step S108. Because the total number of images cannot be acquired unless the directory search ends, in a case where the screen is displayed with data indication, the reproducing image number and the total number of images are not displayed as shown in FIG. 12. Therefore, after the directory search ends, the total image number display processing in step S108 is performed, and the screen is displayed with data indication similar to FIG. 7B.

Next, the system controller 50 proceeds to a normal reproduction processing in step S109 to perform a normal reproduction operation. In the normal reproduction operation, all operations can be performed, including menu displaying, data indication ON/OFF switching, deletion, search, index playback, enlargement/reduction, and the like.

FIG. 4 shows a detailed flow of the button depression processing in step S106 in FIG. 3.

Figure 13:
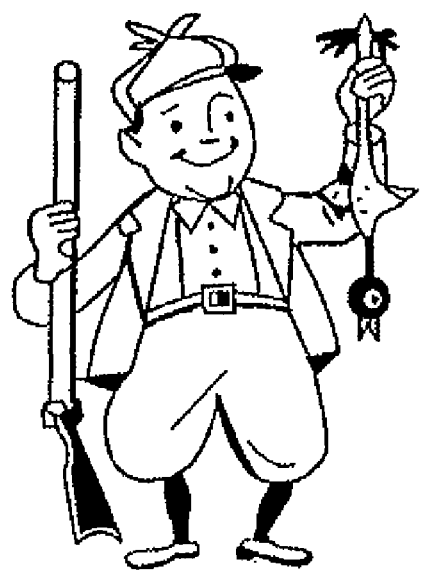
FIG. 13 is a view showing as an example a display screen where an operation cannot be accepted according to the embodiment of the present invention.

The system controller 50 determines the type of button depressed (S201). If the depressed button is the menu button 301, delete button 304, search button 305, or index playback button 306, the control proceeds to step S202 where a message "processing in progress" is displayed for two seconds. FIG. 13 shows an example of the screen displaying the message "processing in progress." Displaying the message is performed to notify the user of the image processing apparatus 100 that the apparatus cannot accept a button operation.

If the system controller 50 determines in step S201 that the power ON/OFF button 60 is depressed, the image processing apparatus termination processing is performed, and the power is turned OFF (S203).

If the system controller 50 determines in step S201 that the reduce button 307 or the enlarge button 308 is depressed, enlargement or reduction processing is performed on the currently displayed image (S204). Enlargement and reduction processing has already been described above with reference to FIGS. 11A to 11C.

If the system controller 50 determines in step S201 that the left or right button 309 or 310 for frame-by-frame advancing is depressed, frame-by-frame advancing is performed (S205 to S208). The system controller 50 temporarily halts the directory search that has started in step S104 (S205), and stores information regarding how far the search has progressed, how many images have been searched and the like in the memory 30. Then, the system controller 50 searches for an image to be displayed by frame-by-frame advancing (S206) and displays the retrieved image (S207). Assume that the images recorded in the recording medium 200 have a directory structure shown in FIG. 5. When the image file IMG_9802.JPG is currently displayed on the display unit 54, if the left button 309 is depressed, the image file IMG_9801.JPG is displayed. If the right button 310 is depressed, the image file IMG_9803.JPG is displayed on the display unit 54. Next, the system controller 50 resumes the directory search based on the data stored in the memory 30 when the directory search was temporarily halted in step S205 (S208).

Hereinafter, a description is provided with reference to FIGS. 5 and 15 on the data recorded in the memory 30 when the directory search is temporarily halted and resumed in steps S205 to S208.

Assume that the image IMG_9802.JPG is currently displayed on the display unit 54 and the directory search of 998GANON and 101GANON has been completed as shown in FIG. 15. In this state, if frame-by-frame advancing is instructed, the directory search is temporarily halted in step 3205. Upon completion of the frame-by-frame advancing in step S207, the directory search of 100GANON, which has not been subjected to a search, is resumed in step S208.

Furthermore, assume that the image IMG_9803.JPG is currently displayed on the display unit 54 and the directory search of 998GANON and 101GANON has been completed as shown in FIG. 15. In this state, if the right button 310 is depressed for frame-by-frame advancing, the IMG_0001.JPG under the directory 100GANON (see FIG. 5) is searched in step S206 and displayed on the display unit 54. Since the directory search of 100GANON has not been completed at this stage, the directory search of 100GANON is performed. After the directory search of 100GANON is performed, IMG_0001.JPG is retrieved and displayed on the display unit 54. When the directory search processing is completed, the directory data recorded in the memory 30 indicates completion of all data search as shown in FIG. 14B.

If the system controller 50 determines in step S201 that the easy direct button 313 is depressed, the currently displayed image is transferred to a PC or a printer. The system controller 50 determines a device connected through the communication unit 110, and transfers the image displayed on the display unit 54 to the connected device (S210).

If the system controller 50 determines in step S201 that the data indication ON/OFF button is depressed, data indication ON/OFF switching is performed (S209). Data indication ON/OFF switching has already been described above with reference to FIGS. 7A and 7B. Note that the total number of images cannot be acquired unless the directory search ends. Therefore, when the data indication is ON, the reproducing image number and the total number of images are not displayed as shown in FIG. 12.

As set forth above, according to the present embodiment, upon start-up of a camera for reproduction it is possible to reduce the time necessary before the camera becomes ready to accept an operation. Before the camera completes a search operation of all directories and/or files, it is possible to perform frame-by-frame advancing, enlargement or reduction, data indication ON/OFF switching, power OFF, and image transferring. However, the camera does not accept deletion processing and other operations that require changes in the directory structure such as voice memo addition, as well as index playback that requires displaying of a large amount of images at once. When such unacceptable operation is performed, a message indicative of unacceptance is displayed, thereby notifying the user of the image processing apparatus.

The present embodiment has described file deletion and voice memo addition as an example that requires changes in the directory structure. In addition, an operation that entails, for instance, file copying, file moving, and new file generation, may be decided as an unacceptable operation until the end of all directory search, as it requires changes in the directory structure.

Although the present embodiment provides the search button 305, the up button 311 in FIG. 2 may be used as a search button. When the menu or the like is not displayed as shown in FIGS. 7A and 7B (in other words, during an image playback), depressing the up button 311 causes a shift to search processing, displaying the 10-image jump screen shown in FIG. 9A. In the state in FIG. 9A, depressing the up or down button 311 or 312 enables selection of other search processing, e.g., 100-image jump search, moving-image jump search (FIG. 9B), and date jump search (FIG. 9C). Besides the up button 311, any button may be used as a search button. As described above, by making use of an existing button such as the up button, an operation member can be reduced, and the image processing apparatus 100 can be downsized.

The present embodiment can be achieved by providing a computer-readable recording medium (or a storage medium), recording program codes of software realizing the above-described functions of the embodiment, to a computer system or apparatus, reading the program codes, by a computer (CPU or MPU) of the system or apparatus, from the recording medium, then executing the program. In this case, the program codes read from the recording medium realize the functions according to the embodiment, and the recording medium storing the program codes constitutes the invention. Furthermore, besides aforesaid functions according to the above embodiment are realized by executing the program codes which are read by a computer, the present invention includes a case where an OS (operating system) or the like working on the computer performs part or the entire processes in accordance with designations of the program codes and realizes functions according to the above embodiment.

Furthermore, the present invention also includes a case where, after the program codes read from the recording medium are written in a function expansion card which is inserted into the computer or in a memory provided in a function expansion unit which is connected to the computer, a CPU or the like contained in the function expansion card or unit performs part or the entire processes in accordance with designations of the program codes and realizes functions of the above embodiment.

In a case where the present embodiment is applied to the aforesaid recording medium, the recording medium stores program codes corresponding to the flowcharts described in the embodiment.

Note that the present invention can be applied to a system constituted by a plurality of devices (e.g., host computer, interface, reader, printer) or to a stand-alone apparatus (e.g., copying machine, facsimile machine).

The present invention is not limited to the above embodiment and various changes and modifications can be made within the spirit and scope of the present invention. Therefore, to apprise the public of the scope of the present invention, the following claims are made.

This application claims the benefit of Japanese Patent Application No. 2005-040895, filed Feb. 17, 2005, which is hereby incorporated by reference herein in its entirety.

What is claimed is:

1. An image processing apparatus for recording and reproducing an image file, comprising:
   a recording unit constructed to record the image file in a recording medium;
   a search unit constructed to performing a directory search for an image file lastly recorded in the recording medium, for a display of the searched image file on a display device and for all image files recorded in the recording medium, the directory search being started in accordance with a startup of said apparatus;
   an operation unit constructed to instruct an operation for changing the displayed image to the display device; and
   a control unit constructed to control to, in a case where the operation for changing the displayed image by said operation unit is performed during the directory search, interrupt the directory search, and resume the interrupted directory search after completing the search of the image file to be displayed in accordance with the changing instruction of the operation unit.

2. The image processing apparatus according to claim 1, wherein the directory search includes a process for searching a type of directory existing in the recording medium or a number of all images recorded in the recording medium.

3. The image processing apparatus according to claim 1, further comprising:
   a reproduction unit constructed to reproduce the image file on the display device; and
   a setting unit constructed to set a reproduction mode for reproducing the image file by said reproduction unit,
   wherein the reproduction mode includes a first reproduction mode in which, when an operation to instruct reproduction is performed, an order of image file to be reproduced is advanced by one file in accordance with a predetermined reproduction order, and a second reproduction mode in which an order of image file to be reproduced is advanced by a predetermined number of files in accordance with a predetermined reproduction order.

4. The image processing apparatus according to claim 3, wherein in a case where an operation performed during the directory search by a user is unacceptable, said control unit causes the display device to display a warning indicative of unacceptance.

5. The image processing apparatus according to claim 4, wherein the unacceptable operation includes at least one of:
   an operation to delete an image file recorded in the recording medium;
   an operation to add sound data to an image file recorded in the recording medium;
   an operation to move an image file recorded in the recording medium from one directory to another directory;
   an operation to generate a new image file in the recording medium;
   an operation to copy an image file recorded in the recording medium;
   an operation to perform index display of plural reduced images on the display device;
   an operation to cause increase or decrease in a number of files recorded in the recording medium;
   an operation to cause changes in a directory structure recorded in the recording medium; and
   an operation to search a specific file from files recorded in the recording medium.

6. The image processing apparatus according to claim 1, wherein said control unit controls the display device to display a number of all image files when the search of all image files recorded in the recording medium is completed.

7. A control method of an image processing apparatus for recording an image file in a recording medium, comprising the steps of:
   performing a directory search for an image file lastly recorded in the recording medium, for a display of the searched image file on a display device and for all image files recorded in the recording medium, the directory search being started in accordance with a startup of said apparatus;
   receiving an operation for instructing the display device to change the displayed image; and
   controlling to, in a case where the operation for changing the displayed image is received in said receiving step during the directory search, interrupt the directory search, and resume the interrupted directory search after completing the search of the image file to be displayed in accordance with the changing instruction received in said receiving step.

8. The control method according to claim 7, wherein the directory search includes a process for searching a type of directory existing in the recording medium or a number of all images recorded in the recording medium.

9. The control method according to claim 7, further comprising the steps of:
   reproducing the image file on the display device; and
   setting a reproduction mode for reproducing the image file in said reproducing step,
   wherein the reproduction mode includes a first reproduction mode in which, when an operation to instruct reproduction is performed, an order of image file to be reproduced is advanced by one file in accordance with a predetermined reproduction order, and a second reproduction mode in which an order of image file to be reproduced is advanced by a predetermined number of files in accordance with a predetermined reproduction order.

10. The control method according to claim 9, wherein in a case where an operation performed during the directory search by a user is unacceptable, in said controlling step the display device is controlled to display a warning indicative of unacceptance.

11. The control method according to claim 10, wherein the unacceptable operation includes at least one of:
   an operation to delete an image file recorded in the recording medium;
   an operation to add sound data to an image file recorded in the recording medium;
   an operation to move an image file recorded in the recording medium from one directory to another directory;
   an operation to generate a new image file in the recording medium;
   an operation to copy an image file recorded in the recording medium;
   an operation to perform index display of plural reduced images on the display device;
   an operation to cause increase or decrease in a number of files recorded in the recording medium;
   an operation to cause changes in a directory structure recorded in the recording medium; and
   an operation to search a specific file from files recorded in the recording medium.

12. The image processing apparatus according to claim 7, wherein in said controlling step the display device is controlled to display a number of all image files when the search of all image files recorded in the recording medium is completed.

* * * * *